United States Patent
Valentin et al.

(10) Patent No.: US 10,824,226 B2
(45) Date of Patent: Nov. 3, 2020

(54) HIGH SPEED, HIGH-FIDELITY FACE TRACKING

(71) Applicant: Google LLC, Mountain View, CA (US)

(72) Inventors: Julien Pascal Christophe Valentin, Mountain View, CA (US); Jonathan James Taylor, Mountain View, CA (US); Shahram Izadi, Tiburon, CA (US)

(73) Assignee: Google LLC, Mountain View, CA (US)

( * ) Notice: Subject to any disclaimer, the term of this patent is extended or adjusted under 35 U.S.C. 154(b) by 89 days.

(21) Appl. No.: 16/002,595

(22) Filed: Jun. 7, 2018

(65) Prior Publication Data

US 2018/0356883 A1 Dec. 13, 2018

Related U.S. Application Data

(60) Provisional application No. 62/516,646, filed on Jun. 7, 2017.

(51) Int. Cl.
*G06F 3/01* (2006.01)
*G06T 7/70* (2017.01)
*G06T 7/246* (2017.01)
*G06K 9/00* (2006.01)

(52) U.S. Cl.
CPC ............. *G06F 3/012* (2013.01); *G06F 3/011* (2013.01); *G06K 9/00208* (2013.01); *G06K 9/00228* (2013.01); *G06T 7/251* (2017.01); *G06T 7/70* (2017.01); *G06T 2207/10028* (2013.01); *G06T 2207/20076* (2013.01); *G06T 2207/30201* (2013.01); *G06T 2207/30204* (2013.01)

(58) Field of Classification Search
None
See application file for complete search history.

(56) References Cited

U.S. PATENT DOCUMENTS 9,472,021 B2 10/2016 Dai et al.
2006/0017722 A1* 1/2006 Hong ............... G06T 15/04
345/419

(Continued)

FOREIGN PATENT DOCUMENTS

CN 105023280 A 11/2015

OTHER PUBLICATIONS

Onofrio, Davide, and Stefano Tubaro. "A model based energy minimization method for 3D face reconstruction." 2005 IEEE International Conference on Multimedia and Expo. IEEE, 2005. (Year: 2005).*

(Continued)

*Primary Examiner* — Andrae S Allison

(57) ABSTRACT

An electronic device estimates a pose of a face by fitting a generative face model mesh to a depth map based on vertices of the face model mesh that are estimated to be visible from the point of view of a depth camera. A face tracking module of the electronic device receives a depth image of a face from a depth camera and generates a depth map of the face based on the depth image. The face tracking module identifies a pose of the face by fitting a face model mesh to the pixels of a depth map that correspond to the vertices of the face model mesh that are estimated to be visible from the point of view of the depth camera.

20 Claims, 4 Drawing Sheets

(56) References Cited

U.S. PATENT DOCUMENTS

| | | | | |
|---|---|---|---|---|
| 2009/0244082 | A1* | 10/2009 | Livingston | G06K 9/00275 345/581 |
| 2013/0321410 | A1* | 12/2013 | Sweeney | G06T 15/04 345/420 |
| 2014/0064607 | A1* | 3/2014 | Grossmann | G06T 3/0093 382/154 |
| 2015/0213646 | A1* | 7/2015 | Ma | G06T 17/20 345/420 |
| 2018/0286071 | A1* | 10/2018 | Alexander | A61B 5/0064 |
| 2018/0330496 | A1* | 11/2018 | Ma | H04N 13/156 |

OTHER PUBLICATIONS

Smolyanskiy, Nikolai, et al. "Real-time 3D face tracking based on active appearance model constrained by depth data." Image and Vision Computing 32.11 (2014): 860-869. (Year: 2014).*

International Search Report and Written Opinion dated Sep. 19, 2018 for corresponding International Application No. PCT/US2018/036528, 13 pages.

Weise, Thibaut, et al. "Face/Off: Live Facial Puppetry," Eurographics/ ACM SIGGRAPH Symposium on Computer Animation 2009; Aug. 1, 2009; pp. 9-11.

Zhu, Youding et al., "Constrained Optimization for Human Pose Estimation from Depth Sequences," Computer Vision— ACCV2007; Lecture Notes in Computer Science, ISBN: 978-3-540-76385-7; Nov. 18, 2007; pp. 413-414.

International Preliminary Report on Patentability dated May 14, 2019 for corresponding International Application No. PCT/US2018/036528, 15 pages.

Baltrusaitis, et al., "Openface: an open source facial behavior analysis toolkit." Applications of Computer Vision (WACV), 2016 IEEE Winter Conference on. IEEE, 2016.

Blanz, Volker, and Thomas Vetter. "A morphable model for the synthesis of 3D faces." Proceedings of the 26th annual conference on Computer graphics and interactive techniques. ACM Press/Addison-Wesley Publishing Co., 1999.

Booth, James, et al. "3D Face Morphable Models "In-the-Wild"." Proceedings of the IEEE Conference on ComputerVision and Pattern Recognition. 2017.

Bouaziz, et al., "Online modeling for realtime facial animation." ACM Transactions on Graphics (TOG) 32.4 (2013), NY, New York, USA: 40.

Cao, Chen, et al., "Real-time high-fidelity facial performance capture," ACM Transactions on Graphics (TOG) 34.4:46 (Aug. 2015), New York, USA.

Cao, Chen, et al. "3D shape regression for real-time facial animation." ACM Transactions on Graphics (TOG) 32.4 (2013): 41.

Cao, Chen, "Facewarehouse: A 3D facial expression database for visual computing," IEEE Transactions on Visualization and Computer Graphics, 20(3):413-425, 2014.

Hsieh, Pei-Lun, et al. "Unconstrained realtime facial performance capture." Proceedings of the IEEE Conference on Computer Vision and Pattern Recognition. 2015.

Kabsch, Wolfgang. "A discussion of the solution for the best rotation to relate two sets of vectors." Acta Crystallographica Section A: Crystal Physics, Diffraction, Theoretical and General Crystallography 34.5 (1978): 922.

Kazemi, "Real-time face reconstruction from a single depth image," 3DV, Tokyo, Japan, Dec. 2014.

Kazemi, Vahid, and Josephine Sullivan. "One millisecond face alignment with an ensemble of regression trees." Proceedings of the IEEE conference on computer vision and pattern recognition. 2014.

Kim, H., "Inversefacenet: Deep single-shot inverse face rendering from a Single image," CorRR, abs/1703.10953, 2017.

Laine, Samuli, et al. "Facial performance capture with deep neural networks." arXiv preprint arXiv:1609.06536 (2016).

Meytlis, Marsha, and Lawrence Sirovich. "On the dimensionality of face space." IEEE Transactions on Pattern Analysis and Machine Intelligence 29.7 (2007).

Ren, Shaoqing, et al. "Face alignment at 3000 fps via regressing local binary features." Proceedings of the IEEE Conference on Computer Vision and Pattern Recognition. 2014.

Richardson, Elad, et al., "3D face reconstruction by learning from synthetic data." 3D Vision (3DV), 2016 Fourth International Conference on. IEEE, 2016.

S. Saito, et al., "Real-time facial segmentation and performance capture from rgb input," in European Conference on Computer Vision, pp. 244-261, Springer, 2016.

Taigman, Yaniv, et al. "Deepface: Closing the gap to human-level performance in face verification." Proceedings of the IEEE conference on computer vision and pattern recognition. 2014.

Taylor, et al., "The vitruvian manifold:Inferring dense correspondences for one-shot human pose estimation," in Computer Vision and Pattern Recognition (CVPR), 2012 IEEE Conference on, pp. 103-110, IEEE, 2012.

Thies, Justus, et al. "Real-time expression transfer for facial reenactment." ACM Trans. Graph. 34.6 (2015): 183-1.

Thies, Justus, et al. "Face2face: Real-time face capture and reenactment of rgb videos." Proceedings of the IEEE Conference on Computer Vision and Pattern Recognition. 2016.

Thies, Justus, et al. "Facevr: Real-time facial reenactment and eye gaze control in virtual reality." arXiv preprint arXiv:1610.03151 (2016).

Tran, Anh Tuan, et al. "Regressing robust and discriminative 3D morphable models with a very deep neural network." 2017 IEEE Conference on Computer Vision and Pattern Recognition (CVPR). IEEE, 2017.

Viola, et al., "Robust real-time face detection." International journal of computer vision 57.2 (2004): 137-154.

Weise, Thibaut, et al. "Realtime performance-based facial animation." ACM transactions on graphics (TOG). vol. 30. No. 4. ACM, 2011.

Yang, Fei, et al. "Expression flow for 3D-aware face component transfer." ACM Transactions on Graphics (TOG) 30.4 (2011): 60.

Zach, Christopher. "Robust bundle adjustment revisited." European Conference on Computer Vision. Springer, Cham, 2014.

English Translation of Chinese Office Action dated Apr. 28, 2020 for corresponding CN Application No. 201880022747.3, 11 pages.

* cited by examiner

HIGH SPEED, HIGH-FIDELITY FACE TRACKING

CROSS-REFERENCE TO RELATED APPLICATIONS

The present application is related to and claims priority to the following application, the entirety of which is incorporated by reference herein: U.S. Provisional Patent Application Ser. No. 62/516,646, entitled "High Speed and High Fidelity Face Tracking," filed Jun. 7, 2017.

BACKGROUND

Field of the Disclosure

The present disclosure relates generally to imagery capture and processing and more particularly to face tracking using captured imagery.

Description of the Related Art

Face tracking allows facial expressions and head movements to be used as an input mechanism for virtual reality and augmented reality systems, thereby supporting a more immersive user experience. A conventional face tracking system captures images and depth data of the user's face and fits a generative model to the captured image or depth data. To fit the model to the captured data, the face tracking system defines and optimizes an energy function to find a minimum that corresponds to the correct face pose. However, conventional face tracking systems typically have accuracy and latency issues that can result in an unsatisfying user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
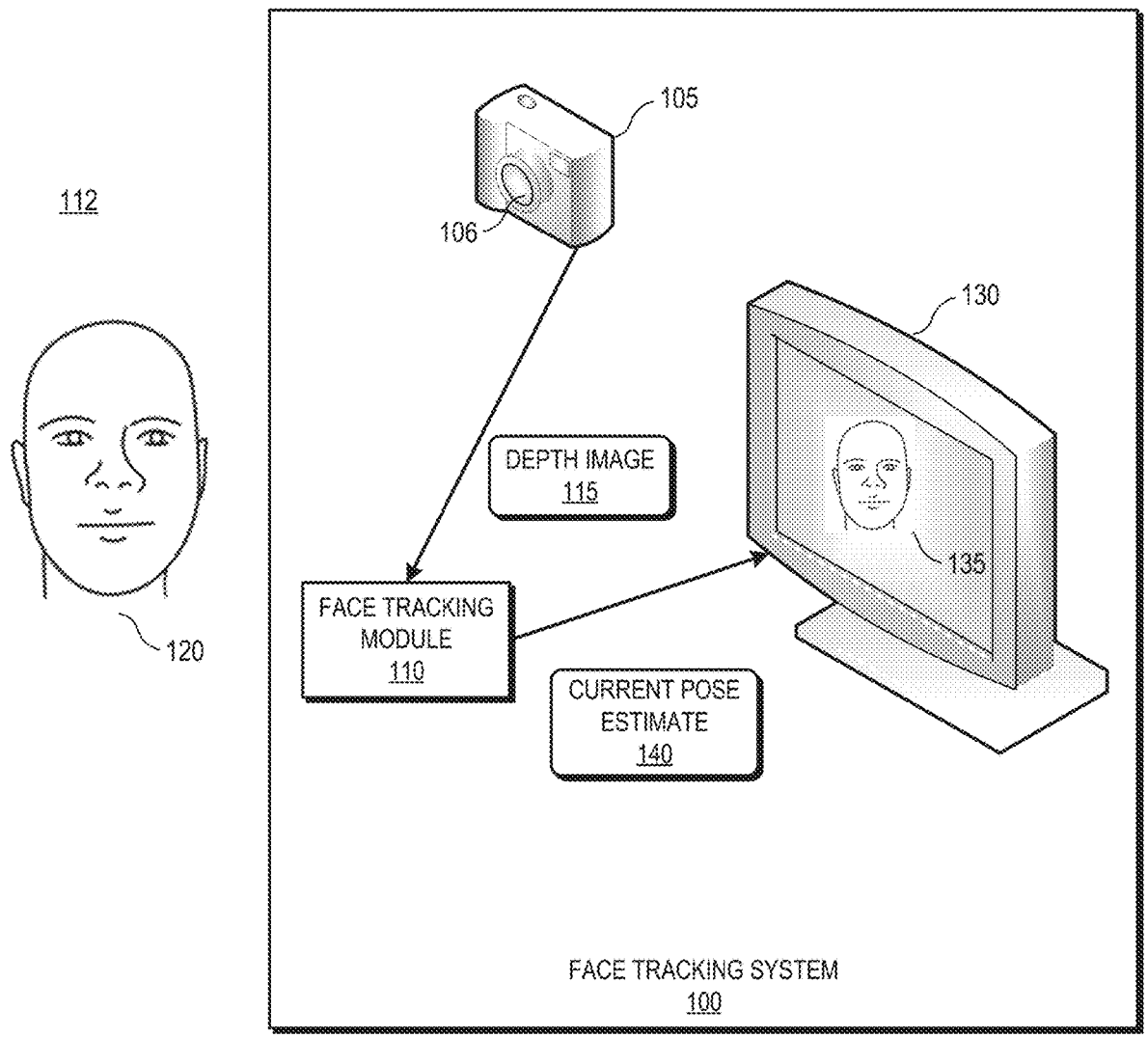
FIG. 1 is a diagram illustrating a face tracking system estimating a current pose of a face based on a depth image in accordance with at least one embodiment of the present disclosure.

The following description is intended to convey a thorough understanding of the present disclosure by providing a number of specific embodiments and details involving estimating a pose of a face by fitting a generative face model mesh to a depth map based on vertices of the face model mesh that are estimated to be visible from the point of view of a depth camera. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-4 illustrate techniques for estimating a pose of a face by fitting a generative face model mesh to a depth map of the face, based on vertices of the face model mesh that are estimated to be visible from the point of view of a depth camera. A face tracking module receives a depth image of a face from a depth camera and generates a depth map of the face based on the depth image. The face tracking module identifies a pose of the face by fitting a face model mesh to the pixels of a depth map that correspond to the vertices of the face model mesh that are estimated to be visible from the point of view of the depth camera. The face tracking module estimates which vertices of the face model mesh are visible from the point of view of the depth camera by assuming that the face model mesh is largely convex (i.e., the face model mesh is more convex than not). In some embodiments, the face tracking module estimates which vertices of the face model mesh are visible from the point of view of the depth camera by estimating the degree to which a vector that is normal to each vertex of the face model mesh is facing toward or away from the depth camera. By including only the vertices of the face model mesh that are estimated to be visible, the face tracking module does not associate those vertices of the face model mesh for which associations with the depth image should not exist (i.e., for vertices that are not visible from the point of view of the depth camera). Excluding such vertices improves accuracy of the facial pose estimation, because if those vertices were included, an energy function used to estimate the pose would become inaccurate, as the energy function would assign a high energy to a correct pose.

In some embodiments, the face model mesh is parameterized by a set of identity and expression coefficients that indicate how to non-rigidly deform the vertices of the face model mesh to fit the depth map. In some embodiments, the face tracking module bicubically interpolates the depth map to smooth intersections at pixel boundaries. The face tracking module adjusts the identity and expression coefficients to better match the depth map. The face tracking module then minimizes an energy function based on the distance of each visible vertex of the face model mesh to the depth map to identify the face model mesh that most closely approximates the pose of the face.

FIG. 1 illustrates a face tracking system 100 configured to support face tracking functionality for AR/VR applications, using depth sensor data in accordance with at least one embodiment of the present disclosure. The face tracking system 100 is an electronic device that can include a user-portable mobile device, such as a tablet computer, computing-enabled cellular phone (e.g., a "smartphone"), a head-mounted display (HMD), a notebook computer, a personal digital assistant (PDA), a gaming system remote, a television remote, camera attachments with or without a screen, and the like. In other embodiments, the face tracking system 100 can include another type of mobile device, such as an automobile, robot, remote-controlled drone or other airborne device, and the like. For ease of illustration, the face tracking system 100 is generally described herein in the example context of a mobile device, such as a tablet computer or a smartphone; however, the face tracking system 100 is not limited to these example implementations. The face tracking system 100 includes a face tracking module 110 for estimating a current pose 140 of a face 120 based on a depth image 115 captured by a depth camera 105 in accordance with at least one embodiment of the present disclosure.

The depth camera 105, in one embodiment, uses a modulated light projector (not shown) to project modulated light patterns into the local environment, and uses one or more imaging sensors 106 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth images" 115 and are made up of a three-dimensional (3D) point cloud having a plurality of points. In some embodiments, the depth camera 105 calculates the depths of the objects, that is, the distances of the objects from the depth camera 105, based on the analysis of the depth images 115.

The face tracking module 110 receives a depth image 115 from the depth camera 105 and generates a depth map based on the depth image 115. The face tracking module 110 identifies a pose of the face 120 by fitting a face model mesh to the pixels of the depth map that correspond to the face 120. In some embodiments, the face tracking module 110 estimates parameters $\theta=\{\alpha, \beta, t, q\} \in \mathbb{R}^D$ of the generative face model mesh to explain the data from a RGB-D pair $\mathcal{J}$. In some embodiments, the face tracking module 110 leverages the parameters $\hat{\theta}$ inferred in the previous frame received from the depth camera. In some embodiments, the model is parameterized by a set of identity coefficients $\alpha(\theta) \in \mathbb{R}^H$, a set of expression weights, or coefficients $\beta(\theta) \in \mathbb{R}^K$, a three-dimensional (3D) position of the head $t(\theta) \in \mathbb{R}^3$ and a quaternion indicating the 3D rotation of the head $q(\theta) \in \mathbb{R}^4$. The identity and expression coefficients indicate how to non-rigidly deform the 3D positions (vertices) of the face model mesh to fit corresponding pixels of the depth map. In some embodiments, the face model mesh is a triangular mesh model. The face tracking module 110 models the deformation of the 3D positions of the face model mesh using a bi-linear (PCA) basis of the N 3D vertex positions where $V_\mu \in \mathbb{R}^{3 \times N}$ represents the mean face, $\{V_h^{id}\}_{h=1}^H \subseteq \mathbb{R}^{3 \times N}$ are a set of vertex offsets that can change the identity of the face and $\{V_k^{exp}\}_{k=1}^K \subseteq \mathbb{R}^{3 \times N}$ are a set of vertex offsets that can change the expression of the face. Under a set of parameters θ, the face tracking module 110 calculates the deformed and repositioned vertices of the face model mesh as $$V(\theta) = R(\theta)(V_\mu + \Sigma_{k=1}^K \beta_k(\theta) V_k^{exp} + \Sigma_{h=1}^H \alpha_h(\theta) V_h^{id}) + t(\theta) \quad (1)$$

where $R(\theta) = R(q(\theta)) \in \mathbb{R}^{3 \times 3}$ maps the quaternion in θ into a rotational matrix.

The face tracking module 110 estimates the parameters θ of the face model mesh given the depth image $\mathcal{J}$ based on a probabilistic inference problem in which it solves $$\theta_{map} = \underset{\theta}{\operatorname{argmax}} P(\theta \mid \mathcal{J}) = \underset{\theta}{\operatorname{argmax}} P(\mathcal{J} \mid \theta) P(\theta) \quad (2)$$

In some embodiments, the face tracking module 110 assumes that the likelihood and prior are functions belonging to the exponential family, and uses the negative log form to rewrite the maximization problem of Equation (2) as $$\theta_{map} = \underset{\theta}{\operatorname{argmin}} E_{data}(\theta) + E_{reg}(\theta) \quad (3)$$

with $$E_{data}(\theta) = E_{land}(\theta) + E_{depth}(\theta). \quad (4)$$

To facilitate increased efficiency of minimizing the energy, the face tracking module 110 includes only the vertices of the face model mesh that are assumed to be visible from the point of view of the depth camera 105, and bicubically interpolates the depth map associated with $\mathcal{J}$, allowing the face tracking module 110 to jointly optimize the pose and blendshape estimation of the face 120 using a smooth and differentiable energy. Based on the energy, the face tracking module estimates a current pose 140 of the face 120.

In some embodiments, the face tracking module 110 uses the current pose estimate 140 to update graphical data 135 on a display 130. In some embodiments, the display 130 is a physical surface, such as a tablet, mobile phone, smart device, display monitor, array(s) of display monitors, laptop, signage and the like or a projection onto a physical surface. In some embodiments, the display 130 is planar. In some embodiments, the display 130 is curved. In some embodiments, the display 130 is a virtual surface, such as a three-dimensional or holographic projection of objects in space including virtual reality and augmented reality. In some embodiments in which the display 130 is a virtual surface, the virtual surface is displayed within an HMD of a user. The location of the virtual surface may be relative to stationary objects (such as walls or furniture) within the local environment 112 of the user.

Figure 2:
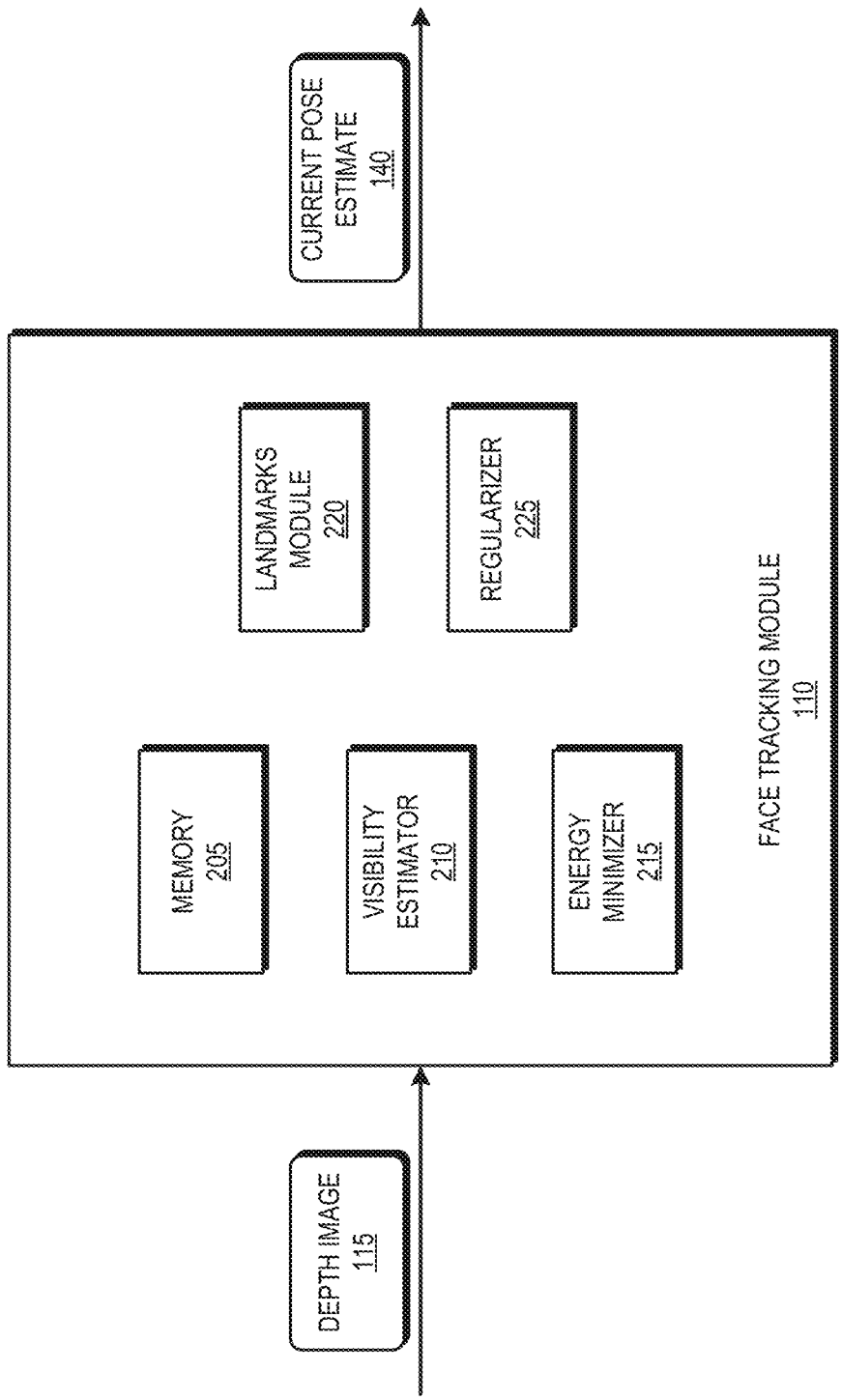
FIG. 2 is a diagram illustrating a face tracking module of the face tracking system of FIG. 1 configured to estimate a current pose of a face based on a depth image in accordance with at least one embodiment of the present disclosure.

FIG. 2 is a diagram illustrating the face tracking module 110 of the face tracking system 100 of FIG. 1 in accordance with at least one embodiment of the present disclosure. The face tracking module 110 includes a memory 205, a visibility estimator 210, an energy minimizer 215, a landmarks module 220, and a regularizer 225. Each of these modules represents hardware, software, or a combination thereof, configured to execute the operations as described herein. The face tracking module 110 is configured to receive a depth image 115 from the depth camera (not shown) and to generate a current pose estimate 140 based on the depth image 115.

The memory 205 is a memory device generally configured to store data, and therefore may be a random access memory (RAM) memory module, non-volatile memory device (e.g., flash memory), and the like. The memory 205 may form part of a memory hierarchy of the face tracking system 100 and may include other memory modules, such as additional caches not illustrated at FIG. 1. The memory 205 is configured to receive and store the depth image 115 from the depth camera (not shown).

The visibility estimator 210 is a module configured to estimate whether a vertex of the face model mesh is visible from the point of view of the depth camera by determining to what degree the associated normal is facing toward or away from the depth camera.

$$S_n(\theta) = \frac{1}{1 + e^{-\left(\frac{N_n(\theta)^T [001]^T}{\delta} + v\right)}} \quad (5)$$

where $N_n(\theta)$ is the normal vector of vertex n. The parameters $\delta$ and $\nu$ respectively control the curvature and where the value 0.5 is reached.

The energy minimizer 215 is a module configured to formulate and minimize an energy function describing the difference between the face model mesh and the depth map of the face. The energy function may be defined as $$E_{depth}(\theta) = \sum_{n \in O(\theta)} \|\mathcal{D}(\Pi(V_n(\theta))) - [001]V_n(\theta)\|^2 \quad (6)$$

where $O(\theta) \subseteq \{1, \ldots, N\}$ is the set of visible vertex indices under $\theta$, $V_n(\theta) \in \mathbb{R}^3$ is the position of the n'th vertex under pose $\theta$, $\Pi: \mathbb{R}^3 \to \mathbb{R}^2$ projects the 2D image domain and $\mathcal{D}(\cdot)$ returns the depth of the closest pixel in the depth image associated with $\mathcal{J}$. However, $\mathcal{D}(\Pi(V_n(\theta)))$ is a piecewise constant mapping and is usually held fixed during optimization. Thus, obtaining the set $O(\theta)$ requires an explicit rendering and endows the function with discontinuities. Accordingly, (6) is only smooth and differentiable once each vertex is associated with a specific depth value. In such a case, rendering and explicit correspondences must be re-established in closed form every time the pose $\theta$ is updated.

To facilitate more efficient pose estimation without necessitating rendering, based on the visibility estimates of the visibility estimator 210, the energy minimizer 215 replaces the sum (6) over an explicit set of vertices $O(\theta)$ with a sum over all vertices $\{1, \ldots, N\}$ using the visibility term to turn on and off the individual terms as $$E_{depth}(\theta) = \sum_n \|(\mathcal{D}(\Pi(V_n(\theta))) - [001]V_n(\theta))S_n(\theta)\|^2 \quad (7)$$

In some embodiments, the energy minimizer allows $\mathcal{D}(\cdot)$ to bicubically interpolate the depth map associated with $\mathcal{J}$, such that the energy is fully differentiable and well defined. In some embodiments, to handle outliers, the energy minimizer 215 can use any smooth robust kernel $\psi$:

$$E_{depth}(\theta) = \sum_n \psi(\|(\mathcal{D}(\Pi(V_n(\theta))) - [001]V_n(\theta))S_n(\theta)\|^2) \quad (8)$$

The landmarks module 220 is a module configured to detect and localize distinctive features (e.g., nose tip, eye corners), referred to as landmarks, of human faces. Landmarks provide strong constraints, both for the general alignment of the face and for estimating the identity and expression of the face. However, detected landmarks can be slightly incorrect, or may be estimated if they are not directly visible by the depth camera 105, resulting in residuals in the image domain. The landmarks module 220 thus defines L facial landmarks $\{f_l\}_{l=1}^L \in \mathbb{R}^2$, confidence weights $\{w_l\}_{l=1}^L \in \mathbb{R}$, and associated vertex indices $\{\eta_l\}_l^L \subseteq \{1, \ldots, N\}$. The landmarks module 220 minimizes an energy function that reduces the variation in landmarks due to the distance of the face from the depth camera 105:

$$E_{land}(\theta) = \frac{M_d(\theta)}{f} \sum_{l=1}^L w_l \|f_l - \Pi(V_{\eta_l}(\theta))\|_2^2 \quad (9)$$

where $M_d(\theta)$ is the average depth of the face and f is the focal length of the depth camera 105.

The regularizer 225 is a module configured to adjust the identity and expression weights to avoid over-fitting the depth map. The regularizer 225 normalizes the eigen-vectors (blendshapes) to provide a standard normal distribution. While expression coefficients generally do not follow a Gaussian distribution, identity parameters roughly do. The regularizer 225 performs statistical regularization by minimizing the $L_2$ norm of the identity parameters. The weights adjustor 225 therefore effectively encourages solutions to be close to the maximum likelihood estimation (MLE) of the multivariate Normal distribution, which is the mean face. The regularizer 225 performs the statistical regularization using $$E_{reg}(\theta) = \Sigma_{k=1}^K \beta_k(\theta)^2 + (\Sigma_{h=1}^H \alpha_h^2 - E[\chi_{|H|}^2])_2 \quad (10)$$

where the distribution has H degrees of freedom. This constraint effectively encourages solution $[\alpha_1(\theta), \ldots, \alpha_H(\theta)]$ to remain close to the "shell" at a distance H from the mean face, which is where the vast majority of faces are in high dimensions.

In some embodiments, the regularizer 225 incorporates temporal regularization overall the entries of $\theta$ during the joint optimization by adding in the following temporal regularization term to the energy:

$$E_{temp}(\theta) = \omega^{id}\|\alpha(\hat{\theta}) - \alpha(\theta)\|_2^2 + \omega^{exp}\|\beta(\hat{\theta}) - \beta(\theta)\|_2^2$$

$$\omega^{trans}\|t(\hat{\theta}) - t(\theta)\|_2^2 + \omega^{rot}\|q(\hat{\theta}) - q(\theta)\|_2^2 \quad (11)$$

where $q(\theta) \in \mathbb{R}^4$ is the sub-vector of rotational parameters in quaternion form, and $\hat{\theta}$ is the solution from the previous frame.

In some embodiments, the face tracking module 110 optimizes the energy function of (11) by recasting the energy function of (11) as a sum of M squared residuals $$E(\theta) = r(\theta)^T r(\theta) \quad (12)$$

where $r(\theta) \in \mathbb{R}^M$. In some embodiments, the face tracking module 110 computes the Jacobian $J(\theta) \in \mathbb{R}^{D \times D}$ and performs Levenberg updates (which are variants of Gauss-Newton updates) as $$\theta \leftarrow \theta + (J(\theta)^T J(\theta) + \lambda I_{D \times D})^{-1} J^T(\theta) r(\theta) \quad (13)$$

where $\lambda$ is a damping term that can be increasingly raised when steps fail in order to achieve very small gradient descent like updates. The face tracking module 110 initializes $\theta \leftarrow \hat{\theta}$ using the parameters from the previous frame. In some embodiments, the face tracking module 110 performs this Levenberg optimization on a GPU. The face tracking module 110 generates a current pose estimate 140 of the face based on the optimized energy.

Figure 3:
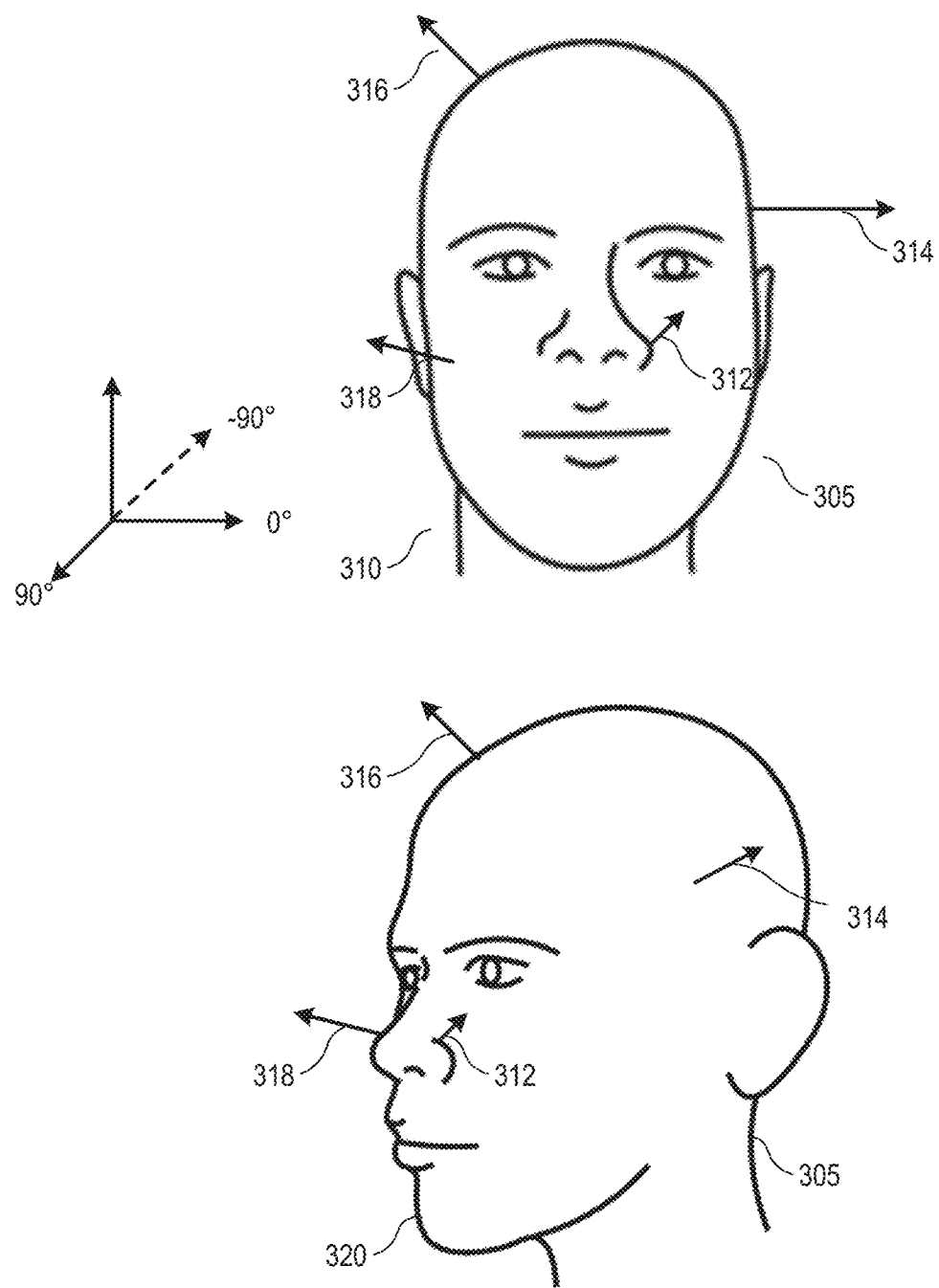
FIG. 3 is a diagram illustrating estimating visibility of vertices of a face model mesh in accordance with at least one embodiment of the present disclosure.

FIG. 3 illustrates the face tracking module 110 of FIGS. 1 and 2 estimating the visibility of vertices of a face model mesh 305 in poses 310 and 320 in accordance with at least one embodiment of the present disclosure. The face model mesh 305 includes a plurality of vertices, each of which the face tracking module 110 associates with a normal vector. In the example of FIG. 3, where the face model mesh 305 is in a frontal facing pose 310, the visibility estimator 210 estimates the degree to which normal vectors 312, 314, 316, and 318 are pointing toward the depth camera (not shown). This is based on the assumption that the face is largely convex, and thus normal vectors pointing toward the camera can typically be assumed to be visible. This assumption is violated only occasionally around the non-convex regions beside the nose and the ears.

Assuming that the depth camera is facing FIG. 3, the visibility estimator 210 assigns a value to each vertex of the face model mesh 305 based on whether the normal vector associated with the vertex is estimated to face toward or away from the depth camera. For example, if 90° is considered directly facing (orthogonal to) the depth camera, and −90° is considered facing directly away from the depth camera, the visibility estimator 210 assigns a first value (e.g., 1) indicating that a normal vector associated with a vertex is visible from the point of view of the depth camera, and assigns a second value (e.g., 0) indicating that a normal vector associated with a vertex is not visible from the point of view of the depth camera.

Accordingly, for the pose 310, the visibility estimator 210 estimates that the vector 312 is at a 45° angle to the depth camera, that vector 314 is at a 2° angle to the depth camera, that vector 316 is at a 2° angle to the depth camera, and that vector 318 is at a 10° angle to the depth camera. The visibility estimator 210 assigns a value of 1 to the vertices associated with each of vectors 312, 314, 316, and 318, because each vector is estimated to be pointing toward the depth camera.

For the pose 320, however, the face model mesh 305 is rotated to the left, such that the visibility estimator 210 estimates that vector 312 is at a 10° angle to the depth camera, that vector 314 is at a 20° angle to the depth camera, that vector 316 is at a −20° angle to the depth camera, and that vector 318 is at a −45° angle to the depth camera. The visibility estimator 210 therefore assigns a value of 1 to the vertices associated with each of vectors 312 and 314, because vectors 312 and 314 are estimated to be pointing toward the depth camera. However, the visibility estimator assigns a value of 0 to the vertices associated with each of vectors 316 and 318 when the face model mesh 305 is in pose 320, because vectors 316 and 318 are estimated to be pointing away from the depth camera. By assigning values of 0 or 1 to the vertices of the face model mesh 305 based on whether the normal vector associated with each vertex is estimated to face toward or away from the depth camera, the face tracking module 110 can smoothly turn on and off data terms of the energy function without rendering the face model mesh 305.

Figure 4:
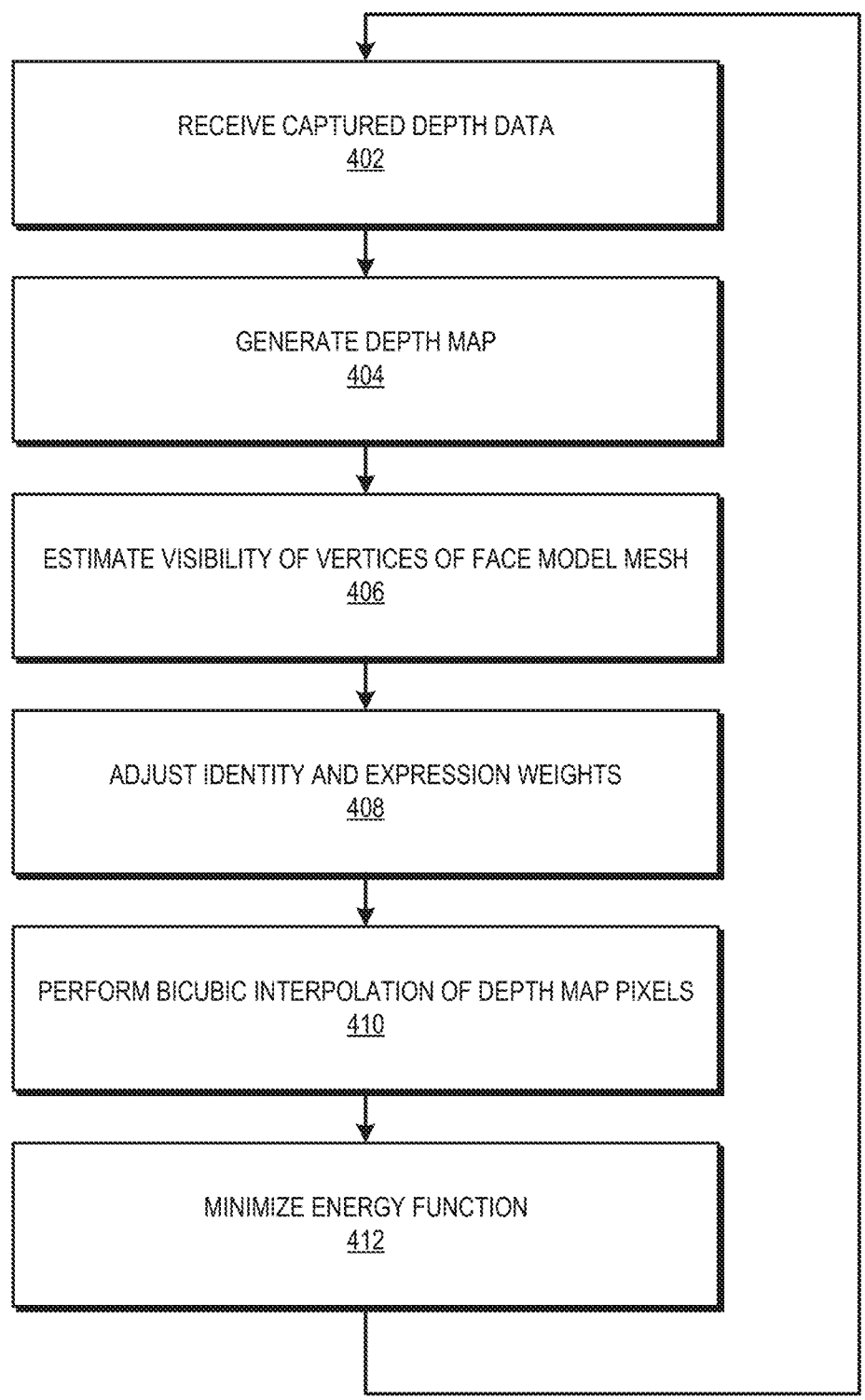
FIG. 4 is a flow diagram illustrating a method of estimating a pose of a face in accordance with at least one embodiment of the present disclosure.

FIG. 4 is a flow diagram illustrating a method 400 of estimating a pose of a face in accordance with at least one embodiment of the present disclosure. At block 402, the face tracking module 110 of FIGS. 1 and 2 receives captured depth data from the depth camera 105. At block 404, the face tracking module 110 generates a depth map of the face 120 based on the captured depth data. At block 406, the visibility estimator 210 estimates the visibility of each vertex of a face model mesh 305 based on an estimate of whether a normal vector associated with each vertex of the face model mesh 305 points toward or away from the depth camera 105. At block 408, the regularizer 225 adjusts identity and expression weights of the face model mesh 305 to avoid overfitting to the depth map. At block 410, the energy minimizer 215 bicubically interpolates the pixels of the depth map to smooth the energy function as features move from one pixel to another. At block 412, the energy minimizer 215 defines and minimizes an energy function that fits the face model mesh 305 to the depth map. In some embodiments, the energy minimizer 215 leverages a pose of a frame of the depth camera immediately preceding a current frame to optimize the energy function.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
capturing, at a depth camera, a depth image of a face, the depth image comprising a three-dimensional (3D) point cloud comprising a plurality of points;
generating, at a processor, a depth map of the face based on the 3D point cloud, the depth map comprising a plurality of pixels; and
estimating, at the processor, a pose of the face by fitting a face model mesh comprising a plurality of vertices to the depth map, the fitting comprising:
estimating which vertices of the face model mesh are visible from a point of view of the depth camera based on an estimation of a degree to which a vector that is normal to each vertex of the face model mesh is facing toward or away from the depth camera; and
minimizing an energy function based on a distance from each pixel of the depth map to a corresponding vertex of a subset of the vertices of the face model mesh, the subset comprising only the vertices that are estimated to be visible from the point of view of the depth camera.

2. The method of claim 1, wherein estimating which vertices of the face model mesh are visible from the point of view of the depth camera comprises assuming that the face model mesh is more convex than not.

3. The method of claim 1, wherein the face model mesh is a triangular mesh model.

4. The method of claim 1, wherein the face model mesh is parameterized by expression weights that indicate how to non-rigidly deform the vertices of the face model mesh to fit the face model mesh to the depth map, and wherein identifying the pose of the face comprises adjusting the expression weights.

5. The method of claim 1, wherein the face model mesh is parameterized by identity coefficients that indicate how to non-rigidly deform the vertices of the face model mesh to fit the face model mesh to the depth map.

6. The method of claim 1, further comprising bicubically interpolating the pixels of the depth map associated with the depth image.

7. The method of claim 1, further comprising regularizing a difference between the pose estimation and an estimate of facial landmarks based on an average depth of the depth map and a focal length of the depth camera.

8. A method, comprising:
generating, at a processor, a depth map of a face based on a depth image of the face captured at a depth camera, the depth map comprising a plurality of pixels;
estimating, at the processor, which vertices of a face model mesh comprising a plurality of vertices are visible from the point of view of the depth camera based on an estimation of a degree to which a vector that is normal to each vertex of the face model mesh is facing toward or away from the depth camera;
minimizing, at the processor, an energy function based on a distance between each pixel of the depth map and a subset of the plurality of vertices comprising the face model mesh, the subset comprising only the vertices that are estimated to be visible from a point of view of the depth camera; and
estimating, at the processor, a current pose of the face based on a pose of the face model mesh that yields the minimized energy function; and
updating graphical data on a display based on the estimated current pose.

9. The method of claim 8, further comprising estimating, at the processor, which vertices of the face model mesh are visible from the point of view of the depth camera based on assuming that the face model mesh is more convex than not.

10. The method of claim 9, wherein the face model mesh is a triangular mesh model.

11. The method of claim 8, wherein the face model mesh is parameterized by expression weights that indicate how to non-rigidly deform the vertices of the face model mesh to fit the face model mesh to the depth map, and wherein identifying the pose of the face comprises adjusting the expression weights.

12. The method of claim 8, wherein the face model mesh is parameterized by identity coefficients that indicate how to non-rigidly deform the vertices of the face model mesh to fit the face model mesh to the depth map.

13. The method of claim 8, further comprising bicubically interpolating the pixels of the depth map.

14. An electronic device, comprising:
a user-facing depth camera to capture depth images of a face of a user, each depth image comprising a three-dimensional (3D) point cloud comprising a plurality of points; and
a processor configured to:
generate a depth map of the face based on the 3D point cloud, the depth map comprising a plurality of pixels; and
estimate a pose of the face by fitting a face model mesh comprising a plurality of vertices to the depth map, the fitting comprising:
estimating which vertices of the face model mesh are visible from a point of view of the depth camera based on an estimation of a degree to which a vector that is normal to each vertex of the face model mesh is facing toward or away from the depth camera; and
minimizing an energy function based on a distance from each pixel of the depth map to a corresponding vertex of a subset of the vertices of the face model mesh, the subset comprising only the vertices that are estimated to be visible from the point of view of the depth camera.

15. The electronic device of claim 14, wherein estimating which vertices of the face model mesh are visible from the point of view of the depth camera comprises assuming that the face model mesh is more convex than not.

16. The electronic device of claim 14, wherein the face model mesh is a triangular mesh model.

17. The electronic device of claim 14, wherein the face model mesh is parameterized by expression weights that indicate how to non-rigidly deform the vertices of the face model mesh to fit the face model mesh to the depth map, and wherein identifying the pose of the face comprises adjusting the expression weights.

18. The electronic device of claim 14, wherein the face model mesh is parameterized by identity coefficients that indicate how to non-rigidly deform the vertices of the face model mesh to fit the face model mesh to the depth map.

19. The electronic device of claim 14, further comprising bicubically interpolating the pixels of the depth map associated with the depth image.

20. The electronic device of claim 14, wherein the processor is further configured to regularize a difference between the pose estimation and an estimate of facial landmarks based on an average depth of the depth map and a focal length of the depth camera.

* * * * *